(12) United States Patent
Lin

(10) Patent No.: US 6,862,695 B2
(45) Date of Patent: Mar. 1, 2005

(54) METHOD AND DEVICE FOR IDENTIFYING FAILED DEVICES IN COMPUTER

(75) Inventor: Johnson Lin, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 513 days.

(21) Appl. No.: 09/822,875

(22) Filed: Mar. 30, 2001

(65) Prior Publication Data

US 2002/0144191 A1 Oct. 3, 2002

(51) Int. Cl.$^7$ .............................................. G06F 11/00
(52) U.S. Cl. ........................................ 714/36; 714/46
(58) Field of Search ............................ 714/36, 46, 48, 714/57

(56) References Cited

U.S. PATENT DOCUMENTS

| | | | | |
|---|---|---|---|---|
| 4,633,469 A | * | 12/1986 | Kishi et al. .................... 714/46 |
| 5,012,514 A | * | 4/1991 | Renton ....................... 713/192 |
| 5,018,143 A | * | 5/1991 | Platteter et al. ............... 714/48 |
| 5,327,435 A | * | 7/1994 | Warchol ....................... 714/36 |
| 5,630,142 A | * | 5/1997 | Crump et al. ................ 713/323 |
| 5,644,707 A | * | 7/1997 | Chen ........................... 714/57 |
| 5,815,706 A | * | 9/1998 | Stewart et al. ................. 713/2 |
| 6,173,320 B1 | * | 1/2001 | Cunningham ................ 709/220 |
| 6,234,111 B1 | * | 5/2001 | Ulman et al. ................. 119/54 |
| 6,601,164 B1 | * | 7/2003 | Robertson ....................... 713/1 |
| 2002/0032885 A1 | * | 3/2002 | Dai ............................... 714/57 |

OTHER PUBLICATIONS

White, Ron, "How Computers Work", Sep. 1999, Que, p. 17.*
"MS–6309LE5", Micro–star International, 2002 [http://www.msicomputer.com/product/detail_spec/product_detail.asp?model=MS6309LE5].*
"MSI K7N420 Pro MS–6373(v1.x) ATX Mainboard User's Manual", Micro–star International, Dec. 2001, p. 1–8.*

* cited by examiner

Primary Examiner—Robert Beausoliel
Assistant Examiner—Gabriel L. Chu
(74) Attorney, Agent, or Firm—Volpe and Koenig, P.C.

(57) ABSTRACT

There is provided a method and device for identifying failed devices in a computer by displaying messages indicative of failed devices in the computer with a single luminescent display. A BIOS memory having a plurality of memory locations containing data values representing a series of computer program instructions for testing hardware devices in the computer is provided to test the hardware devices in the computer. If the hardware device in the computer such as RAM, BIOS memory or display adapter is tested to be failed or contains error, the single luminescent display will be driven to blink ON and OFF at different frequencies to respectively indicate individual failed device in the computer.

20 Claims, 8 Drawing Sheets

METHOD AND DEVICE FOR IDENTIFYING FAILED DEVICES IN COMPUTER

FIELD OF THE INVENTION

The present invention generally relates to a method and device for identifying failed devices in a computer, which applies a single luminescent display to display messages indicative of failed devices by blinking the single luminescent display ON and OFF at different frequencies.

DESCRIPTION OF THE PRIOR ART

In the current computer system, BIOS (which is the abbreviation of basic input-output system) acts as a guardian for the computer system. The BIOS contains the basic input/output routines for accessing the computer hardware. It initializes the basic operation of the computer and loads the operating system into memory. If a failure is encountered during the execution of the BIOS setup process, it ordinarily implies that some computer hardware may be defective and can not function properly.

As the computer is powered on, the BIOS will be prosecuted and the program instructions contained in the BIOS program will cause the central processing unit (or CPU) to execute a series of tasks. These tasks are contrived to accomplish the following jobs: (1) The system configuration analysis, which performs, for example, to detect and identify the type and identification of the CPU, the storage size of RAM, the numbers and types of the floppy disk drive/hard disk drive, the type of the floating point processor, (2) The power-on self test (or POST), which is performed to test the RAM, system chipset, CMOS devices, keyboard and disk drive, and (3) operating system loading, by performing the instructions of the bootstrap loader contained in the BIOS routine to find out the locations on the hard disk where the operating system resides and loading the operating system into the RAM from the hard disk.

In the POST process, the BIOS program sequentially performs the test procedure to the RAM, BIOS, and the display adapter. However, if these devices are tested and identified to be failed prior to the test procedure to the display adapter, the tester is impossible to be aware of any failed device in the computer by means of screen display. The tester has to disassemble the computer system and identify the failed devices by himself, in order that the failed devices can be repaired by the repairman. If the failed devices can not be identified in advance, it will consume lots of time in the identification process of the failed devices and disturb the repairman seriously.

Figure 1:
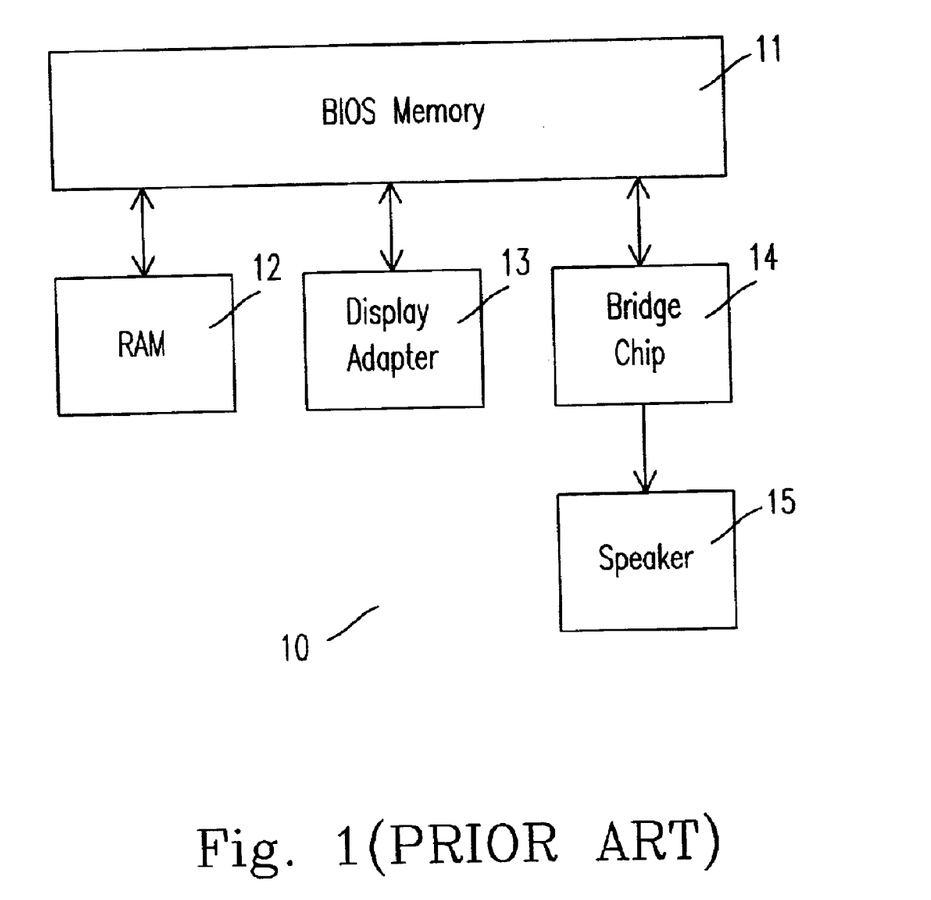
FIG. 1 schematically depicts a block diagram of the device provided for identifying failed device in a computer according to the prior art.

In face of the foregoing problems, an advanced technique has been employed to overcome the difficulties arising from the prior art. As shown in FIG. 1, when the computer 10 is powered on, BIOS memory 11, RAM 12, and display adapter 13 will sequentially be tested. If these devices are tested and identified to be failed, the speaker 15 will be driven by the bridge chip 14 (preferably, the bridge chip 14 is designated as a south bridge chip) and give beeps at different frequencies to respectively indicate the individual failed device in the computer 10. Nonetheless, the tester is difficult to know which device is failed simply by means of the beeps at different frequencies.

Figure 2:
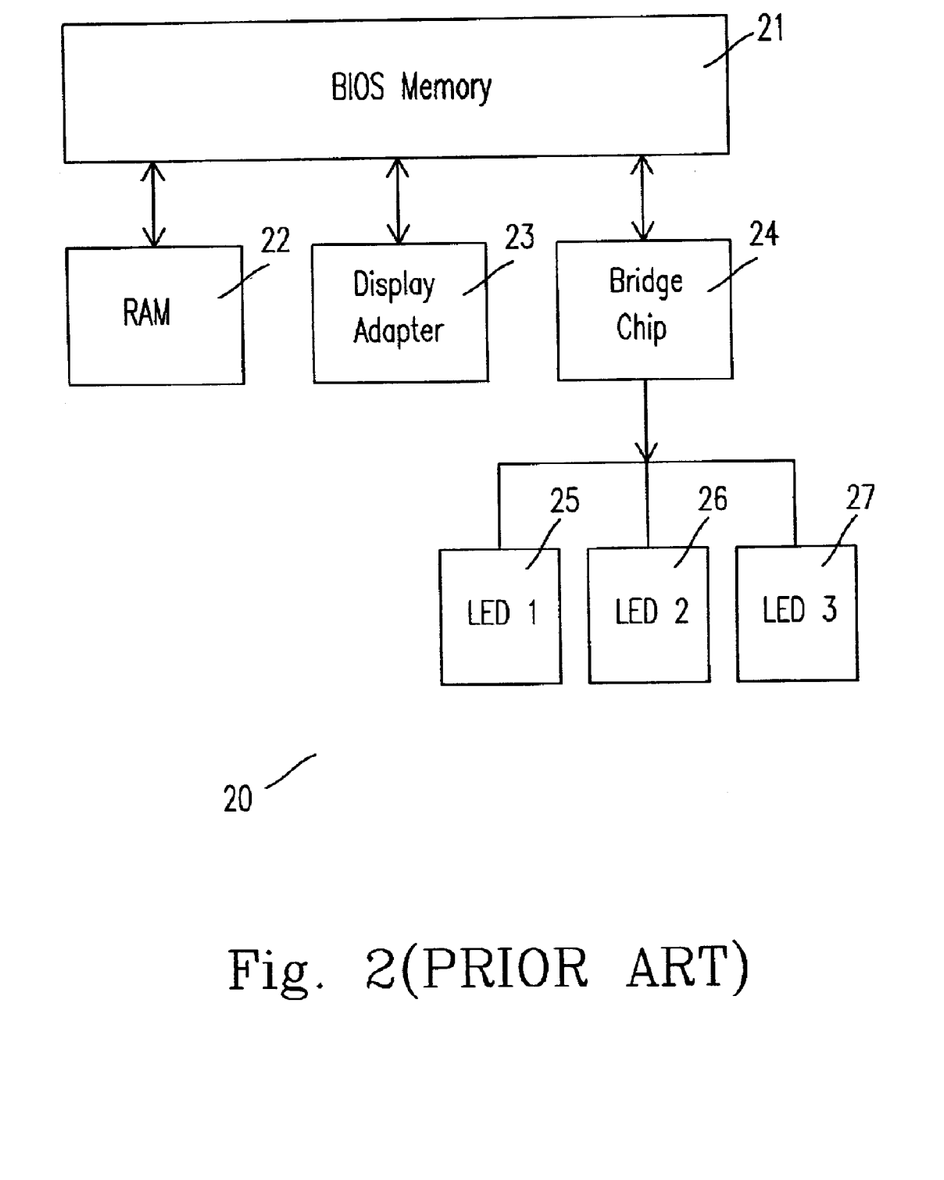
FIG. 2 schematically shows another block diagram of the device provided for identifying failed device in a computer according to the prior art.

Another improved technique for figuring out the difficulties of identifying the failed device in a computer is illustrated in FIG. 2. Three light-emitting diodes (25, 26, 27), each has a different color, are mounted on the motherboard of the computer 20. During the POST process, BIOS memory 21, RAM 22, and display adapter 23 will be tested in turn. If the aforementioned devices are tested and identified to be failed, the three LEDs (25, 26, 27) will be driven to illuminate. Each LED is dedicated to a single failed device. However, such an arrangement for identifying failed devices in a computer is not an ideal scheme. Because LEDs are mounted on the motherboard of the computer, the tester still has to disassemble the computer and check the status of LED to confirm what devices are failed in the computer 20. Moreover, the manufacturing cost of the motherboard will be inevitably increased by reason of the requirement of mounting LEDs on the motherboard.

There is a tendency for the applicant to look for a way to identify the failed devices in a computer, in a convenience and costless manner, by displaying the messages indicative of the failed device in a computer with a single luminescent display.

SUMMARY OF THE INVENTION

It is therefore an object of the present invention to provide a method for identifying failed devices in a computer.

It is another object of the present invention to provide a method for displaying messages indicative of failed devices in a computer.

It is still another object of the present invention to provide a device for identifying failed devices in a computer and displaying messages indicative of failed devices with a single luminescent display.

The preferred embodiment of the present invention provides a method for identifying failed devices in a computer. The method is characterized in that a basic input-output system (BIOS) memory having a plurality of memory locations containing data values representing a series of computer program instructions for testing a hardware device in the computer, wherein a predetermined one of the memory locations contains an error detection value based on the data value in the remaining memory locations of the BIOS memory, is provided to test the hardware devices in the computer and detect an error contained in the BIOS program. The BIOS program tests a first hardware device by identifying the type and ID of the first hardware device. If the first hardware device is tested to be failed, a single luminescent display is provided to blink ON and OFF at a first frequency. Hereinafter, the BIOS program tests a second hardware device which is assigned to the BIOS memory according to the preferred embodiment of the present invention, by checking the error detection value contained at the predetermined memory location of the BIOS memory to detect whether the BIOS program contains error. If the BIOS program is detected to contain error, the single luminescent display will blink ON and OFF at a second frequency which is different from the first frequency. Eventually, the BIOS program tests a third hardware device by identifying the type and ID of the third hardware device. If the third hardware device is tested to be failed, the single luminescent display will blink ON and OFF at a third frequency which is different from the first frequency and the second frequency. Preferably, the error detection value contained in the BIOS program is contained in the checksum value of the BIOS program.

In accordance with another aspect of the present invention, a device is provided to identify failed devices in the computer by displaying the message indicative of failed devices in the computer. The device for identifying failed devices in a computer according to the preferred embodiment of the present invention comprises a single luminescent display which is operable to blink ON and OFF at multiple frequencies, a basic input-output system (BIOS) memory having a plurality of memory locations containing data values representing a series of computer program instructions for testing a hardware device in the computer, and sending a control signal according to the result of the test to the hardware device, and a decoding element receiving the control signal and outputs a driving signal to enable the single luminescent display to blink ON and OFF at a frequency associated with the control signal received thereof.

According to a preferred embodiment of the present invention, the single luminescent display comprises a light-emitting diode mounted on the casing of the computer for indicating the power status of the computer, and the hardware devices to be tested comprise a RAM device, a BIOS memory, and a display adapter. The decoding element preferably comprises a bridge chip, which includes an input/output port provided for communication between the bridge chip and the single luminescent display. A serial interface, for example, a system management bus, is taken as the communication interface for the BIOS memory and the abovementioned hardware devices. In relation to the second embodiment of the present invention, a sound playing device such as a speaker is optionally provided to beep at different frequencies to indicate failed devices in the computer for complementing the single luminescent display.

Now the foregoing and other features and advantages of the present invention will be more clearly understood through the following descriptions with reference to the accompanying drawings, in which:

DETAILED DESCRIPTION OF THE PREFERRED EMBODIMENT

Figure 3:
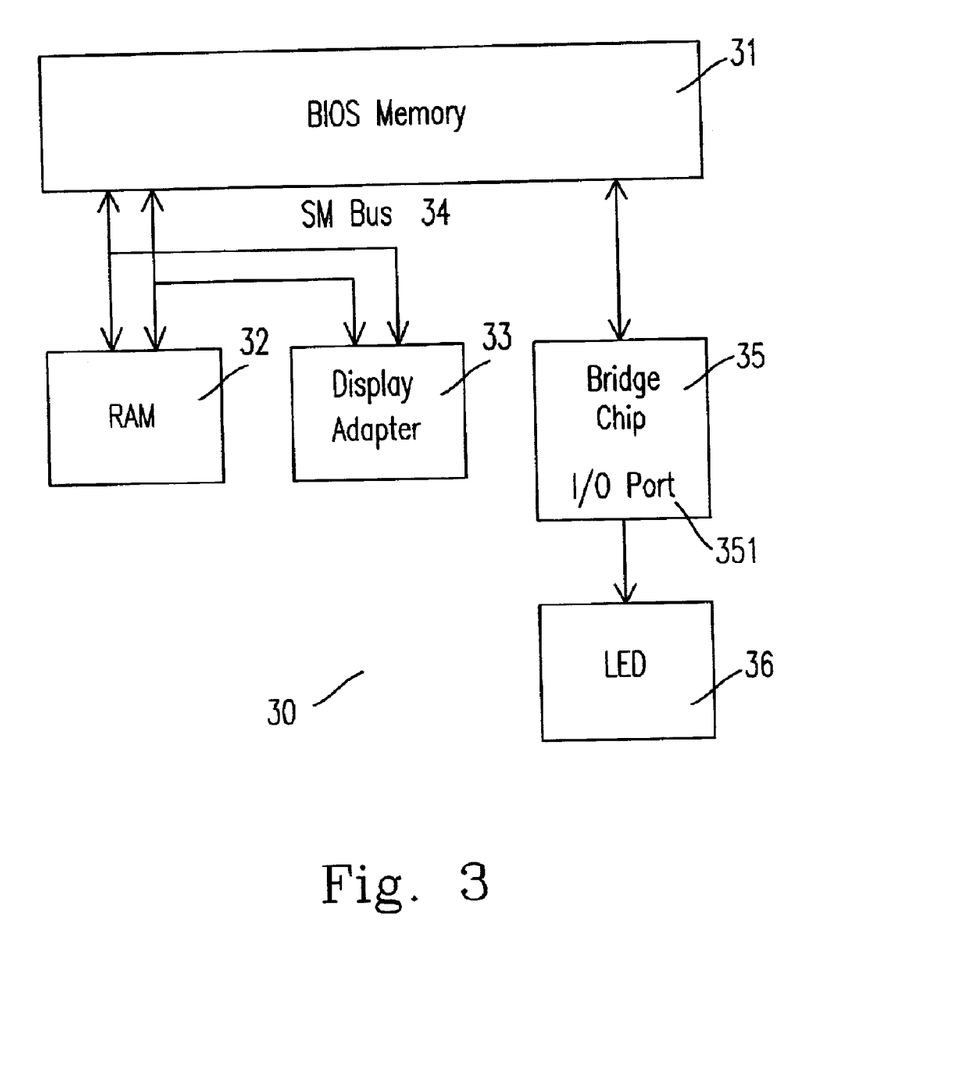
FIG. 3 shows a block diagram of the device provided for identifying failed devices in a computer according to a first exemplary preferred embodiment of the present invention.

Turning now to FIG. 3, a first preferred embodiment of the device for identifying failed devices by displaying messages indicative of failed devices in a computer 30 comprises a BIOS memory 31, a random access memory (RAM) 32 (which comprises a dynamic random access memory in the preferred embodiment), a display adapter 33, a bridge chip 35, and a light-emitting diode (LED) 36. The LED 36 preferably comprises a power LED inherently mounted on the computer casing which is used to indicate the power status of the computer 30, and the BIOS memory 31 which is preferably directed to a flash read-only memory (or flash ROM) contains data values representing a series of computer program instructions at a plurality of memory locations for initializing the operation of computer 30 and testing the hardware devices presented in the computer 30. As noted above, as a part of the POST procedure, the computer program instructions contained in the BIOS memory cause the central processing unit (or CPU, which is not shown in the drawing for simplicity) to execute the test procedure for the hardware devices in the computer 30. RAM 32 will be first tested in the POST process. The BIOS program contained in the POST routine will instruct CPU to identify the type and identification of the RAM 32. The result of identification of the RAM 32 will be forwarded to BIOS memory 31 by means of a two-wire serial interface, for example, a system management bus (SM bus) interface 34.

The SM bus 34 is treated as a communication interface for both the RAM 32 and the display adapter 33. The well-known SM bus 34 can enable a device to provide the manufacturer information, tell the system what the model/part number is, report different types of errors, accept control parameters, and return status. With the SM bus 34 as the communication interface for the BIOS memory 31 and the hardware devices in the computer 30, the BIOS program can access the model name and the specification information of the hardware devices in computer 30 with ease. If the model name and the specification information of the RAM 32 can not be correctly obtained, the BIOS program will determine that RAM 32 is failed, and send a control signal to the bridge chip 35. The bridge chip 35 functions as a decoding element, which receives the control signal from the BIOS memory 31 and in response thereto, sends a driving signal to the LED 36 through I/O port access over I/O port 351. The LED 36 will start to blink ON and OFF at a first frequency depending on the control signal.

Figure 4:
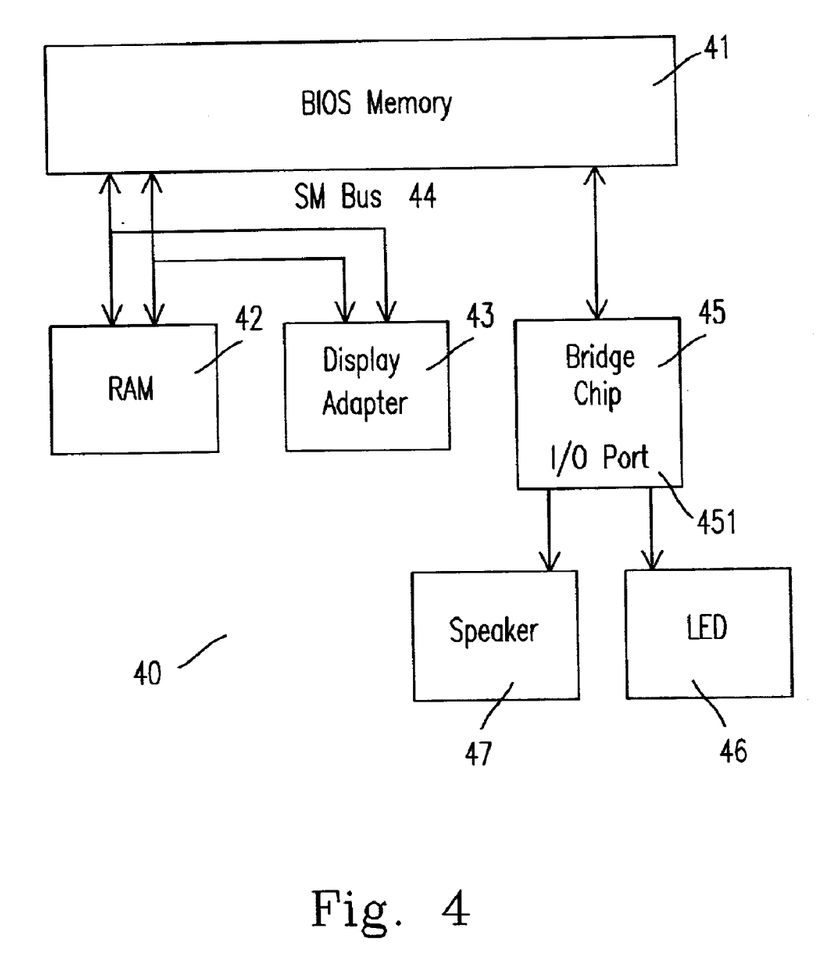
FIG. 4 shows a block diagram of the device provided for identifying failed devices in a computer according to a second preferred embodiment of the present invention.

As the test procedure to the RAM is finished, the BIOS memory 31 will next be tested to detect whether an error is contained therein. The BIOS program contains an error detection value at a predetermined memory location based on the data values at the remaining memory locations of the BIOS memory 31, for example, a checksum value. The POST routine utilizes the checksum value to analyze the entire BIOS program content to detect whether an error is contained in the BIOS program. If the BIOS program contains an error, BIOS memory 31 will send another control signal to the bridge chip 35. The bridge chip 35 receives the control signal and sends a driving signal to the LED 36 through I/O port access over I/O port 351. The LED 36 will start to blink ON and OFF at a second frequency different from the first frequency. Thus, tester can know what devices are failed in the computer by means of the shimmer of the LED 36 at different frequency. Subsequently, the display adapter 33 will be tested by identifying the type and ID of the display adapter 33. If the type and ID of the display adapter 33 can not be correctly obtained, the BIOS memory 31 sends another control signal to the bridge chip 35. The bridge chip 35 receives the control signal from the BIOS memory 31 and sends a driving signal in response to the control signal received thereof to the LED 36. The LED 36 will blink ON and OFF at a third frequency different from the first frequency and the second frequency. In this way, the tester can know what devices are failed in the computer system without effort. FIG. 4 illustrates a second embodiment of the device for identifying failed devices in a computer by displaying messages indicative of failed devices in the computer according to the present invention. Comparing the embodiment of FIG. 4 with the embodiment of FIG. 3, it is to be clearly understood that the embodiment of FIG. 4 further includes an optional speaker 47. The speaker 47 is used to beep at different frequencies to respectively indicate individual failed device in the computer 40. In event that the LED 46 is failed to blink, the speaker 47 can be employed to tell the tester the information in relation to the failed devices in the computer 40.

Figure 5A:
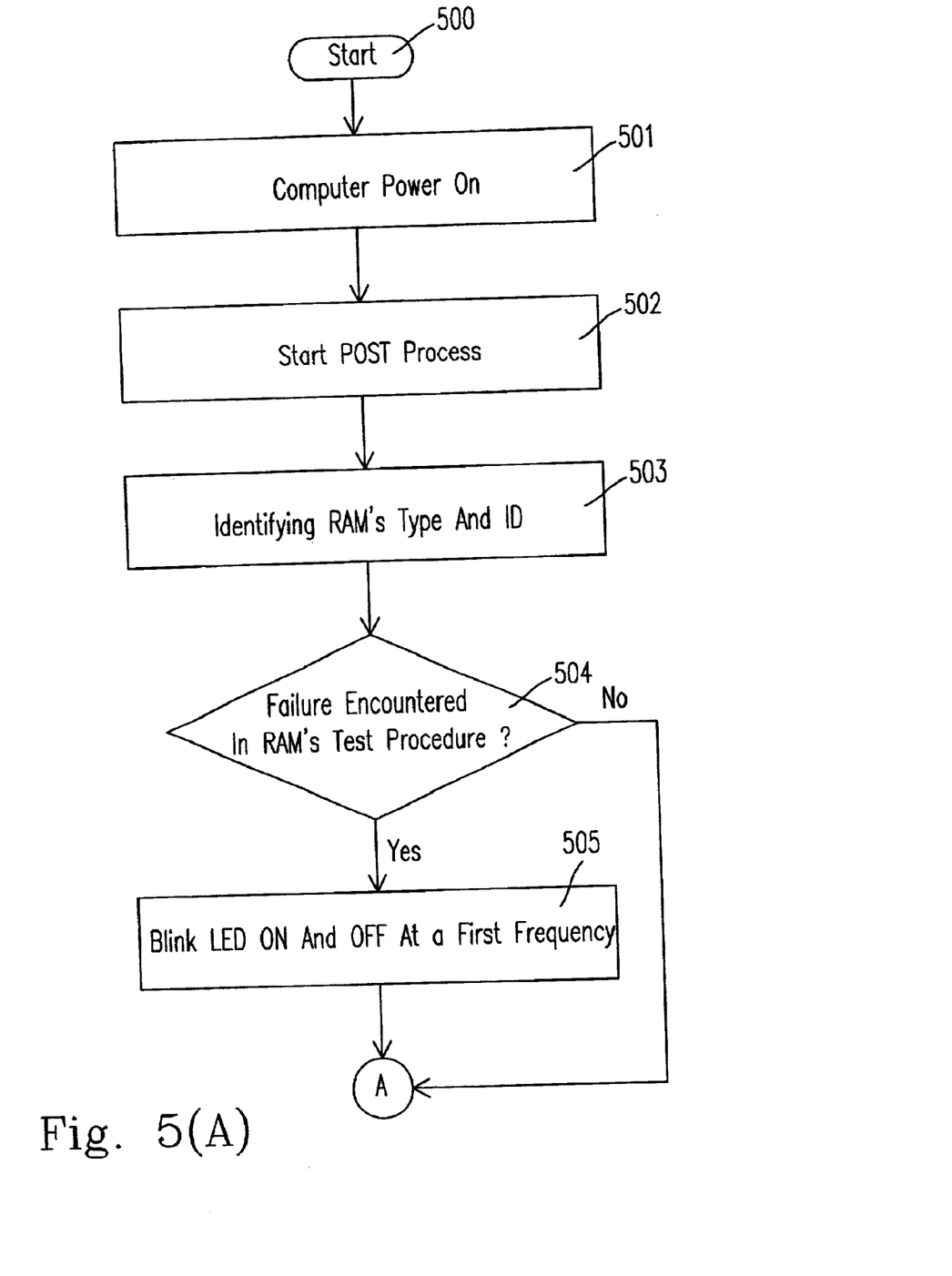
FIG. 5(A) and FIG. 5(B) demonstrates the flow chart for the method of identifying failed device in a computer according to the first preferred embodiment of the present invention.
Figure 5B:
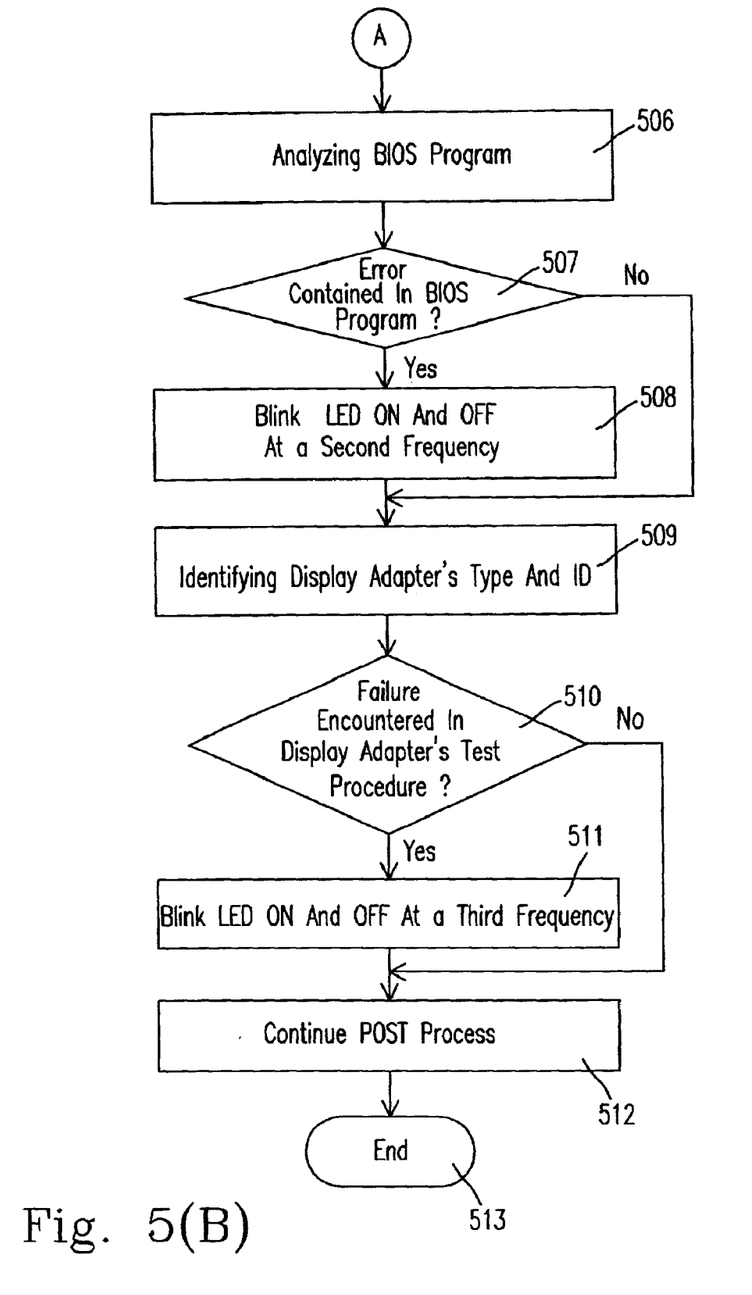

FIG. 5(A) and FIG. 5(B) depict a flow chart of the method for identifying failed devices in a computer according to the first preferred embodiment of FIG. 3. The method for identifying failed device in a computer of the first preferred embodiment of the present invention starts at step 500. After the computer is powered on (step 501), the POST routine contained in the BIOS program will proceed to test the hardware devices in the computer and detect errors contained in the BIOS program (step 502). At step 503, RAM of the computer will be first tested by identifying RAM's type and ID. The POST routine will test the RAM in the computer by identifying the type and ID of the RAM at determinant 504. If RAM's type and ID can not be correctly obtained, the POST routine will determine that RAM is failed, and drive the LED to blink ON and OFF at a first frequency at step 505. If RAM's type and ID is correctly obtained, the command flow of the POST routine will pass to the test procedure to the BIOS program. As illustrated in FIG. 5(B), at step 506, the BIOS program content will be analyzed. The BIOS program will detect whether the BIOS program contains error by checking the checksum value at a predetermined memory location of the BIOS memory at step 507. If the BIOS is detected to contain error, the LED will be driven to blink ON and OFF at a second frequency which is different form the first frequency at step 508. If the BIOS is detected to be free form errors, the display adapter in the computer will subsequently be tested by identifying the type and ID of the display adapter at step 509. At step 510 the display adapter's type and ID will be obtained for identification. If the display adapter's type and ID can not be obtained correctly, the display adapter will be identified to be failed. In the mean time, the LED will be driven to blink ON and OFF at a third frequency which is different from the first frequency and the second frequency at step 511. After the display adapter has been tested, the POST process will continue to test other I/O devices in the computer (step 512) and end at step 513.

Figure 6A:
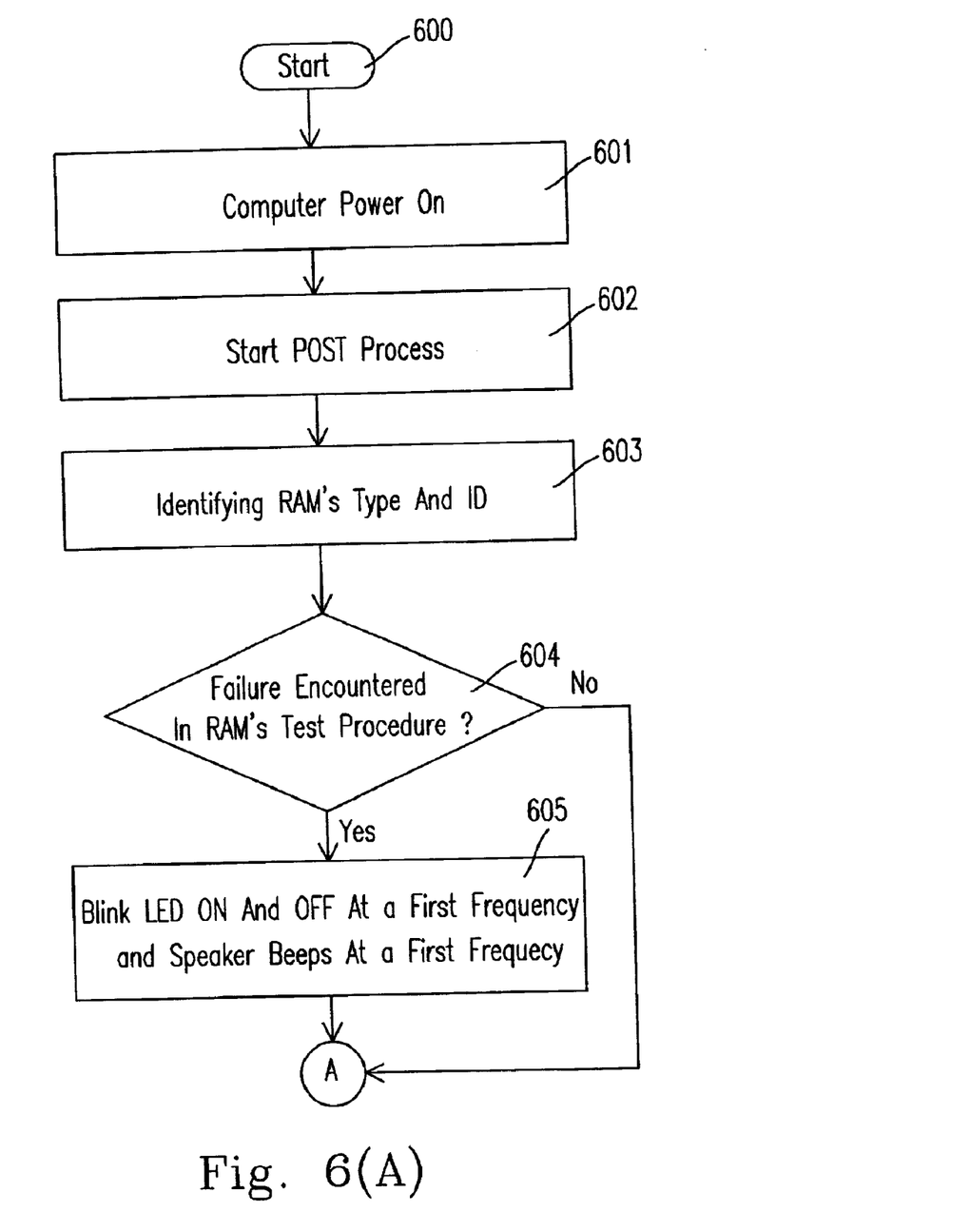
FIG. 6(A) and FIG. 6(B) demonstrates the flow chart for the method of identifying the failed device in a computer according to the second preferred embodiment of the present invention.
Figure 6B:
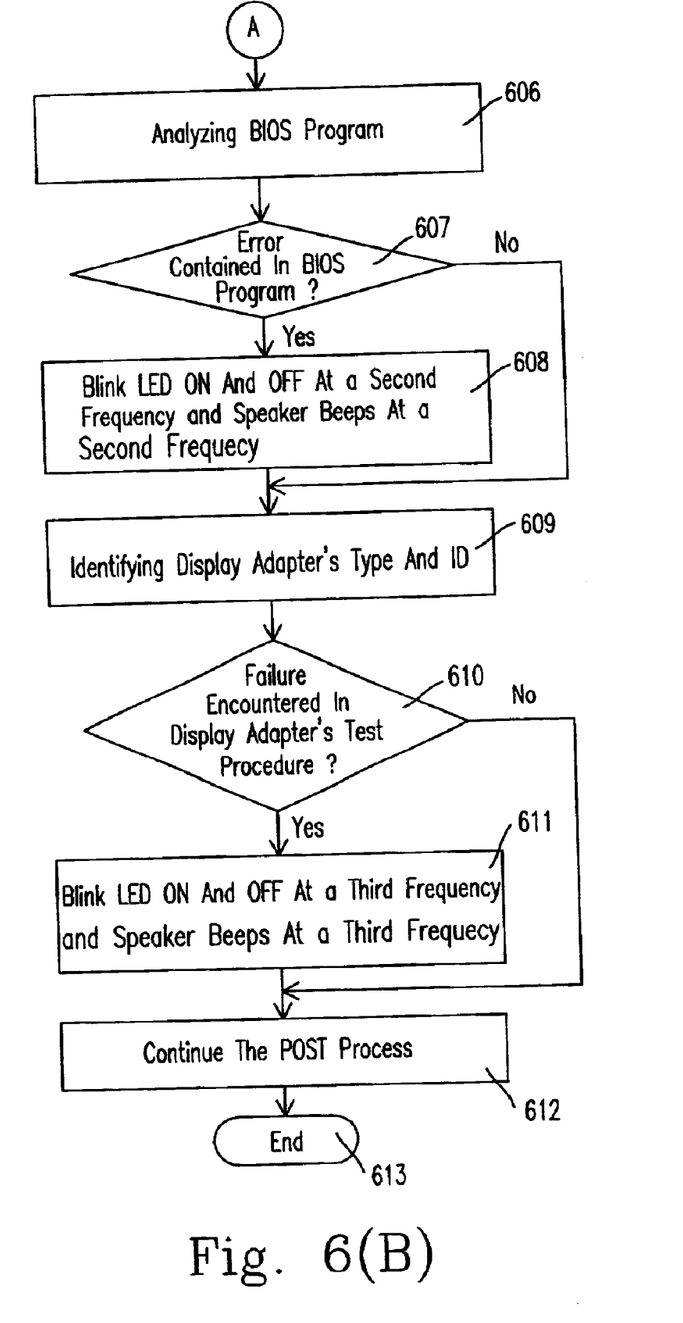

FIG. 6(A) and FIG. 6(B) illustrates a flow chart of the method for identifying failed devices in a computer according to the second preferred embodiment of FIG. 4. The control flows of method for identifying the failed devices in a computer according to FIG. 6(A) and FIG. 6(B) are similar to those of the method for identifying the failed devices in a computer according to FIG. 5(A) and FIG. 5(B), except that the speaker will give off beeps in synchronization with the shimmer of the LED. It is to be noted that the control flows according to FIG. 6(A) and FIG. 6(B) are similar to those of FIG. 5(A) and FIG. 5(B), and we will not have a detailed discussion hereinafter.

To conclude, the present invention takes advantages of a single luminescent display, for example, a light-emitting diode, to display messages indicating failed devices in a computer, by identifying the type and identification of the hardware devices in the computer to drive the single luminescent display to blink ON and OFF at different frequencies. As a result, the tester can identify what devices in the computer are failed according to the shimmer of the single luminescent display with different frequencies. Remarkably, the power LED which is inherently mounted on the computer casing to indicate the power status of computer serves as a single luminescent device for displaying messages indicating failed devices in the computer, and thus it is unnecessary to mount extra LEDs on the computer to provide a display element for showing the error messages indicating the failed devices in the computer. The present invention provides a simple and advantageous way to identify failed devices in a computer, which can greatly facilitate tester's operation and eliminate the occurrence of misjudgment of the failed device in the computer.

Although the present invention has been described and illustrated in detail, it is to be clearly understood that the same is by the way of illustration and example only and is not to be taken by way of limitation, the spirit and scope of the present invention being limited only by the terms of the appended claims.

I claim:

1. A method for identifying a failed device in a computer, said method comprising steps of:
   (a) providing a basic input-output system (BIOS) memory having a plurality of memory locations containing data values representing a series of computer program instructions for testing a device in said computer and for determining if an error resides in said BIOS memory, wherein a predetermined one of said memory locations contains an error detection value based on the data values in the remaining memory locations of said BIOS memory;
   (b) the instructions in said BIOS memory attempting to obtain a model name and specification information of a first device in said computer to determine whether said first device has failed;
   (c) providing a single luminescent display which is mounted on said computer; and
   (d) if said first device is determined to have failed in step (b), blinking said single luminescent display ON and OFF at a first frequency.

2. The method of claim 1 wherein the instructions in said BIOS memory further attempt to obtain manufacturer information of said first device.

3. The method of claim 1 wherein step (b) further comprises analyzing the data values and said error detection value at said predetermined memory location in said BIOS memory.

4. The method of claim 1 further comprising the steps of:
   (e) providing a sound playing device; and
   (f) if said first device is determined to have failed in step (b), driving said sound playing device to beep at said first frequency.

5. The method of claim 1 further comprising the steps of:
   (e) said BIOS memory attempting to obtain a model name and specification information of a second device in said computer to determine whether said second device has failed;
   (f) if said second device is determined to have failed in step (e), blinking said single luminescent display ON and OFF at a second frequency different from said first frequency.

6. The method of claim 5 further comprising the steps of:
   (g) providing a sound playing device; and
   (h) if said second device is determined to have failed in step (e), driving said sound playing device to beep at said second frequency.

7. The method of claim 5 wherein the instructions in said BIOS memory further attempt to obtain manufacturer information of said second device.

8. The method of claim 5 wherein step (e) further comprises analyzing the data values and said error detection value at said predetermined memory location in said BIOS memory.

9. The method of claim 5 further comprising the steps of:
(g) said BIOS memory attempting to obtain a model name and specification information of a third device in said computer to determine whether said third device has failed; and
(h) if said third device is determined to have failed in step (g), blinking said single luminescent display ON and OFF at a third frequency different from said first frequency and said second frequency.

10. The method of claim 9 further comprising the steps of:
(i) providing a sound playing device; and
(j) if said third device is determined to have failed in step (g), driving said sound playing device to beep at said third frequency.

11. The method of claim 9 wherein the instructions in said BIOS memory further attempt to obtain manufacturer information of said third device.

12. The method of claim 9 wherein the step of detecting said third device in said computer further comprises analyzing the data values and said error detection value at said predetermined memory location in said BIOS memory.

13. The method of claim 1 wherein said error detection value at said predetermined memory location in said BIOS memory contains a checksum value.

14. A device for displaying a message indicative of a failed device in a computer, comprising:
a single luminescent display which is mounted on said computer and is operable to blink at multiple frequencies;
a basic input-output system (BIOS) memory having a plurality of memory locations containing data values representing a series of computer program instructions for testing a hardware device in said computer, and sending a control signal according to the result of testing said hardware device, wherein the instructions in said BIOS memory determine whether said hardware device has failed by attempting to obtain a model name and specification information of said hardware device; and
a decoding element which receives said control signal and outputs a driving signal to enable said single luminescent display to blink at a frequency associated with said control signal received thereof if the instructions in said BIOS memory determine that said hardware device has failed.

15. The device of claim 14 wherein said single luminescent display comprises a light-emitting diode mounted on said computer provided for indicating the power status of said computer.

16. The device of claim 14 further comprising a serial interface provided for communication between said BIOS memory and said hardware device.

17. The device of claim 16 wherein said serial interface comprises a system management bus interface.

18. The device of claim 14 wherein said decoding element includes an input/output port for transmitting said driving signal to said single luminescent display.

19. The device of claim 14 wherein said decoding element comprises a bridge chip.

20. The device of claim 14 further comprising a sound playing device which is drivable to beep at a frequency associated with said control signal received thereof.

* * * * *